UNITED STATES PATENT OFFICE 2,048,987

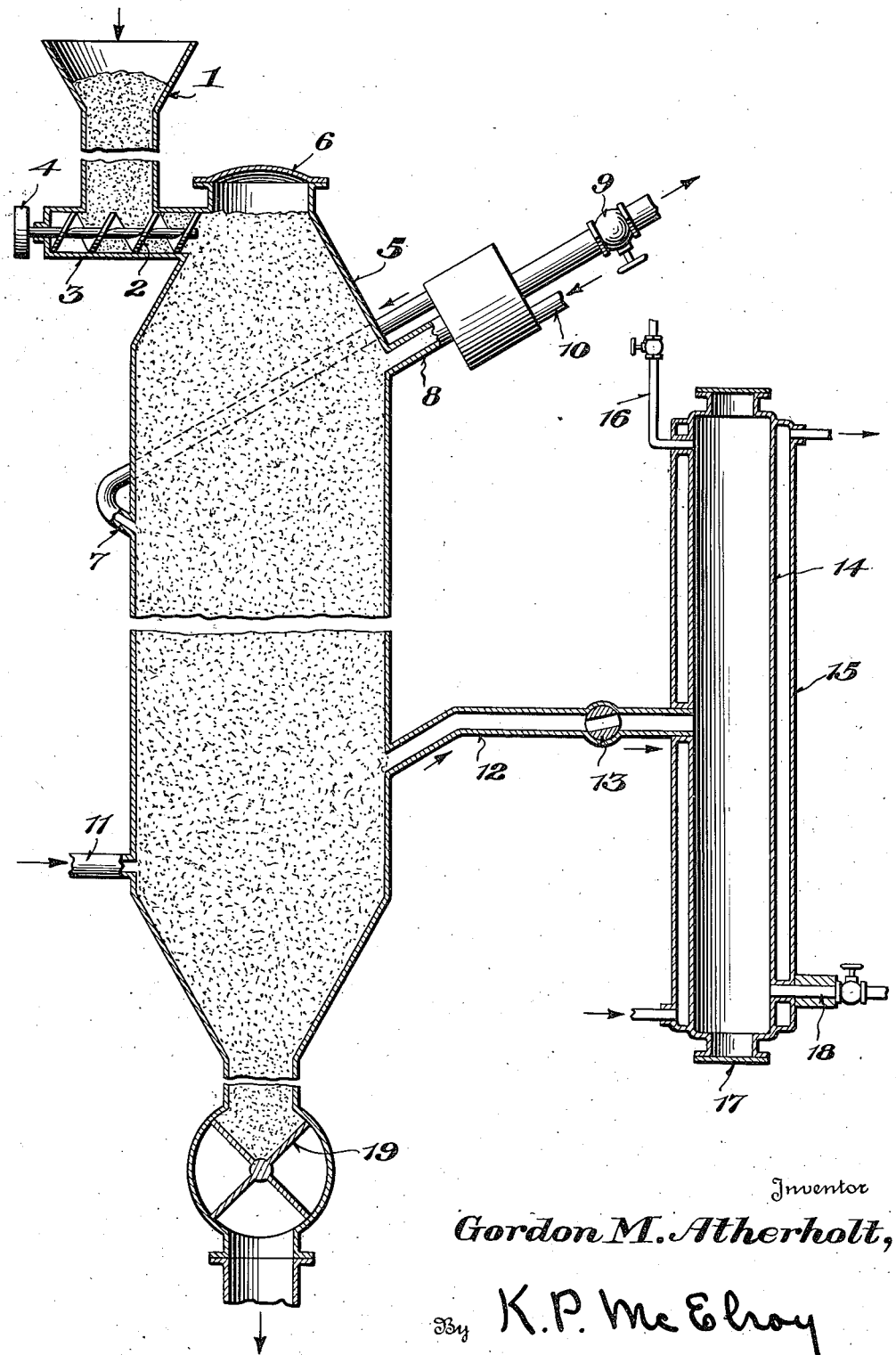

MAKING ALUMINUM CHLORIDE

Gordon M. Atherholt, Mount Lebanon, Pa., assignor, by mesne assignments, to Gulf Oil Corporation, Pittsburgh, Pa., a corporation of Pennsylvania Application January 5, 1934, Serial No. 705,455

10 Claims. (Cl. 23—95)

This invention relates to making aluminum chloride; and it comprises a process wherein carbon (coke), alumina (bauxite) and chlorin are caused to interact to produce aluminum chloride, the interaction being conducted under superatmospheric pressure, and wherein the hot aluminum chloride vapors produced are cooled and condensed under superatmospheric pressure; heat necessary for the reaction being advantageously produced inside the system by introduction of air, and the point of air introduction and of removal of combustion products being away from the points of chlorin introduction and of aluminum chloride removal; all as more fully hereinafter set forth and as claimed.

Aluminum chloride can be made from bauxite, coke and chlorin on a large scale at relatively low cost. But the production is fraught with many technical difficulties. In the present invention the operation is simplified, improved, and rendered more economical and convenient. The raw materials are utilized more completely and a higher percentage of the product is captured.

The heat requirements in making aluminum chloride from bauxite, coke and chlorin vary with conditions; but in all cases the reacting bodies must be brought to a temperature between 600° and 800° C., preliminary to reaction. If carbon is greatly in excess at the point of reaction, the reaction forms a large percentage of CO and the whole action is endothermic, requiring a large supply of heat. With a certain less amount of carbon, the reaction can become exothermic; developing some heat. In ordinary practice, however, an excess of carbon is used and the problem of supplying the necessary heat units at a high temperature plane is difficult of satisfactory solution.

Making aluminum chloride in an externally heated retort has proved impracticable on a large scale for the reason that few materials are available which will resist the action of chlorin, carbon and aluminum chloride, when at red heat. In past practice, the solid materials were generally preheated and were then treated with chlorin in a shaft of some type, a further internal development of heat being effected by introducing air or oxygen with the chlorin.

Collection and condensation of the aluminum chloride vapors produced by the process is not easy. Aluminum chloride, in condensing from the vapor at ordinary pressure, does not pass through a liquid state. It deposits in crystalline solid form on the condensing surfaces; it forms stalactites and thick masses, thereby impeding heat transfer and interfering with further condensation. Special types of condensing apparatus are necessary and these must provide mechanical cleaning of the cooling surfaces. A greater difficulty, however, is the high vapor tension of aluminum chloride at all temperatures; a difficulty accentuated by the fact that the vapors are diluted by oxides of carbon and other diluent gases. The maximum possible concentration of aluminum chloride vapors in the gas mass leaving the reaction zone is about 57 per cent by volume; this corresponding to the equation

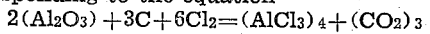
$$2(Al_2O_3) + 3C + 6Cl_2 = (AlCl_3)_4 + (CO_2)_3$$

This equation, incidentally, corresponds to the proportion of reactants giving the most exothermic reaction. If in this reaction, the C is converted into CO, twice as much carbon is needed and for 4 volumes of aluminum chloride vapors there will be 6 volumes of CO; the percentage by volume of aluminum chloride vapors in the retort effluent is 40 per cent. If air is introduced into the system for heating purposes, the concentration of aluminum chloride in the effluent from the reaction chamber is considerably less. The air brings in a large proportion of nitrogen.

In the present invention, I improve on the usual art by conducting the condensation of the aluminum chloride vapors under some superatmospheric pressure; usually a superatmospheric pressure of 15 to 30 pounds is adequate. Where any considerable amount of gases pass from the heating zone into the reaction zone of my apparatus thereby diluting the products of reaction, I find higher pressure necessary in securing the same results.

With methodical operation in a way hereinafter described, the use of pressure in condensation permits the formation of a liquid condensate, which simplifies the condensation and subsequent handling. The percentage recovery of aluminum chloride from the retort effluent is much increased, and the greater the pressure, the greater the recovery. Also, the higher the pressure, the greater the temperature range within which the condensate can be formed in the liquid phase.

In manufacturing aluminum chloride under pressure in the present invention, the superatmospheric pressure also prevails in the reaction zone where aluminum chloride is produced. This gives a better and cleaner reaction; the utilization of bauxite and of chlorin being better.

It is an important advantage of my process that I am enabled to condense the aluminum chloride as a liquid which will drain away from the condensing surface. This permits the use of simple and more convenient condensing means than have been possible where the material condenses directly into a solid form; which latter has been usual practice.

Another important advantage of the described operation, introducing the effluent mixture of gases and vapors from the reaction zone into a condenser under sufficient superatmospheric pressure to permit condensation of aluminum chloride in liquid form, I am also enabled to condense a considerably greater proportion of the aluminum chloride contained in the gas-vapor mixture.

Another important advantage of my process, when using bauxite as the source of aluminum oxide, is that I can select a pressure for condensation which will permit me to also condense out and obtain chlorides of other components of the bauxite; such additional chlorides including titanium tetrachlorid and silicon chloride.

Another important result of the described process is that by conducting the reaction under increased pressure I effect more complete reaction and make a greater amount of aluminum chloride per pound of chlorin used.

In making aluminum chloride it is usual to employ bauxite as the source of $Al_2O_3$ and petroleum coke as the source of C. Petroleum coke has the advantage of being nearly ashless. In the usual process, prior to operation, the bauxite must be dehydrated and the coke must be freed of volatiles. Any water or hydrogen-containing gas going into the reaction zone causes a loss of chlorin as HCl.

While reaction under pressure and condensation under pressure are useful in any method of producing aluminum chloride vapors from hot bauxite ($Al_2O_3$) and coke (carbon) with chlorin, I find one very great advantage in a special way of operating by which I am enabled to obtain more concentrated vapors. In so doing, I find it advantageous to establish and maintain a moving column of a mixture of bauxite and coke. Movement of the column may be up or down or in a horizontal line. Each direction of movement offers some advantage. Into the moving column at one point I introduce air and heat the charge. Or I may use oxygen or oxygen enriched air. The hot gases from this combustion are removed from the column at a point somewhat further along in the line of movement. According to circumstances, the effluent gas will vary between the composition of producer gas and that of products of normal combustion. Other things being equal, the greatest efficiency is obtained with a high percentage of $CO_2$ in the effluent gases at this point. This method of heating, for the purposes of the present application, may be called cross firing, and the effluent gases are solely products of combustion together with undesirable volatiles driven off from the bauxite and coke. By introduction of air in this way, the whole mass is raised to the reaction temperature and given enough sensible heat to take care of the reaction requirements in the chlorinating zone.

The column of heated materials passes forward to a chlorinating zone where chlorin is introduced. The aluminum chloride vapors formed are removed and directed to a condenser. By maintaining the pressure at the point of air introduction somewhat above the pressure in the chlorinating zone, there is no tendency for the chlorine to pass backward out of the casing.

In the chlorinating zone, the requirement for heat to carry on the reaction increases with the amount of carbon present. I therefore advantageously limit the coke in the moving charge at this point as far as is possible with good utilization of bauxite and chlorin. In practice, I observe the composition of the gases leaving the aluminum chloride condensing chamber and regulate the amount of coke so as to obtain the highest possible proportion of $CO_2$ to CO in these gases. The greater the proportion of $CO_2$ to CO in the effluent gases from the aluminum chloride chamber, the less coke is required in the charge. In each case, and with each particular apparatus, there is a critical amount of $CO_2$ corresponding to an optimum utilization of the bauxite and chlorin. A high ratio of $CO_2$ to CO in the reaction effluent means a higher concentration of aluminum chloride in the vapor-gas mixture going to the condenser, and permits more complete condensation.

Cross firing in the way described is particularly advantageous, since the products of combustion incident to the necessary heating, for the greater part, do not pass forward with the aluminum chloride vapors. In this respect, the present invention offers advantages over the usual practice of introducing air and chlorin or chlorin and oxygen.

Cross firing in this method has the additional advantage that raw undehydrated bauxite and crude coke may be used in the charge; the cross firing removing volatiles and sending them outside the system. Thus in my method it is quite feasible to dispense with preliminary removal of volatiles. However, I often find it advantageous to calcine the bauxite and free the coke of volatile matter before introducing them into the retort.

In the accompanying illustration I have shown, more or less diagrammatically, certain apparatus within the purview of my invention and useful in the performance of the process as described. In this showing, the view is of a complete installation, the view being mainly in central vertical section.

Referring to the drawing, element 1 is a hopper receiving a charge of bauxite and coke. These should be intermixed and both should be granular and fairly free of fines. A granule size between those known as wheat and pea in coal is recommended. The bauxite and coke pass downward and are forced forward horizontally by screw 2 in conveyor casing 3. As shown, the conveyor is mounted on a stub shaft and is driven through a pulley 4, or equivalent mechanism. The charge enters the top of a chamber or casing 5, conventionally shown. The chamber is ordinarily of masonry construction. It is provided with an upper manhole and cleaning port having cover 6. The reaction casing may be 10 to 20 feet or more in height, depending on the desired capacity and cross section. The entering coke and bauxite pass slowly downward through the casing. The upper portion of the column is a dead end and there is practically no movement of gases there. This zone never becomes heated to a temperature injurious to the feed mechanism. At a point on the side of the shaft is a port 7 for introduction of air under pressure. At another point in the column, well below the top, is an exit port 8 for the products of combustion. Dampering of discharge from port 8 at some point to assist in maintenance of pressure, if necessary, is indicated by conventionally shown valve 9. The air introduced at port 7 is furnished through conduit 10 in heat transfer relationship to the exit conduit for products of combustion. For simplicity of illustration, a single outlet for products of combustion and a single inlet for air is shown; but in practice products of combustion may be withdrawn at a plurality of points arranged peripherally of the casing and, similarly, air may be introduced at a plurality of points. An arrangement like the bustle pipe of a blast furnace with a plurality of tuyères is suitable. Air introduced at port 7 causes active combustion of some of the carbon and the hot gases pass upward through the charge to outlet port 8. With the particular type of apparatus here shown the products of combustion withdrawn at port 8 will generally be of the character of producer gas; that is they will contain a large amount of CO and be combustible. This is particularly so when a fairly long path through a coke-containing mixture is traversed in passing from port 7 to port 8. If however, the pressure differential between 8 and 7 be maintained sufficient to cause a fairly rapid flow I obtain effluent gas with a greater percentage of $CO_2$. This develops much more heat per pound of carbon consumed and is economical. When combustible gas is obtained at port 8 the gas may be burned to preheat air on its way to port 7, or, mixed with air, the combustible gas may be introduced into port 7 of another casing and burned therein. In the latter case the second casing is fed with a bauxite-coke mixture containing less coke than when air alone is introduced into port 7.

Passing downward beyond the zone of combustion the mixture travels for a time through a portion of the chamber out of the path of the gas currents. This period of travel is desirable to equalize the heat in the granular charge passing to the reaction zone beyond. At a point fairly near the base of the column is chlorin inlet 11. Again, a single point of introduction is shown for simplicity of illustration but I may use multiple ports around a circumference. Chlorin passes into the hot charge, reaction takes place, and aluminum chloride forms. The aluminum chloride vapors formed pass along the column for a short distance to a lateral point of removal 12, provided with a conventionally shown valve 13. They are received by conventionally shown condenser 14 surrounded by a temperature regulating jacket 15. Tail gases pass out of the condenser through valved conduit 16. A bottom manhole 17 is provided for removal of aluminum chloride. Liquefied aluminum chloride is withdrawn through valved and insulated outlet 18 and is conducted therethrough to a packaging means or to point of use.

The setting of the valve on outlet 16 from the condenser controls the pressure throughout the system. The air introduced through port 7 is at a pressure somewhat higher than the pressure at which chlorin is introduced. There is then a pressure differential which prevents chlorin and aluminum chloride passing upward. Ordinarily the pressure difference is so adjusted as to cause no flow whatever or a slight downward passage of products of combustion into the chlorinating zone.

In treating a mixture of bauxite and coke under ideal conditions the mixture is entirely consumed but actually there is always a little material that escapes the action of gas and which accumulates and forms a footing for the descending column of charge mixture. In originally starting up I fill the bottom of the casing with bauxite to form a footing. When this column accumulates to an inconvenient extent some is removed by star valve 19 at the base of the column. This footing of pulverulent material prevents escape of reaction products.

As stated, in establishing and maintaining a moving column of mixed bauxite and coke the line of movement may be up or down, or horizontal. For an upwardly moving column an apparatus of the usual underfeed stoker type can be used and the feed mechanism is then definitely out of the hot zone. For a horizontal moving column, pusher mechanism is again appropriate and can be kept away from the high heat. In downward movement, gravity aids both in the descent of the solids and in the removal of the products of combustion from cross firing. With an upwardly moving column of material and with a horizontally moving mass of material all of the elements of the apparatus are in analogous relation to the moving material and the process is identical with that already described for a downward moving column of material.

In operating the apparatus described it is an object to charge in just enough carbon to give a mixture producing largely $CO_2$ in the chlorinating zone. The nearer the charge in the chlorinating zone approaches the ratio given in the equation ante, the greater is the economy of operation.

Bauxite is commonly used as the raw aluminous material for my process and bauxite varies in content of aluminum oxide. With the best grades of this material, and no substantial leakage of combustion gases from the heating zone to the reaction zone of my apparatus, I find a superatmospheric pressure of 15 pounds to 30 pounds in the condenser to be adequate for my purposes, but low grade bauxite or dilution of reaction products with combustion products require higher pressure.

What I claim is:—

1. In the manufacture of aluminum chloride by the interaction of carbon and allumina and chlorin at high temperature in a reaction zone, and condensing aluminum chloride vapors in a condensing zone in communication with the reaction zone, the improvement which comprises maintaining said zones under sufficient superatmospheric pressure during the interaction to obtain the aluminum chloride in liquid phase in the condensing zone.

2. In the manufacture of aluminum chloride by interaction of carbon and alumina and chlorin in a continuous process at temperature sufficient to create the aluminum chloride as a vapor, the improvement which comprises continuously passing the vapor into a condensing zone and maintaining a pressure in the condensing zone substantially higher than atmospheric, sufficient to raise the boiling point of the aluminum chloride above its melting point, thereby causing the aluminum chloride to be directly condensed to liquid phase.

3. In the manufacture of aluminum chloride by the interaction of carbon, alumina and chlorin at high temperatures, the process which comprises establishing and maintaining a moving column of a pervious mixture of bauxite and coke, at one point in the movement of said column developing heat therein by a cross-current of air and at another point in the column therebeyond forming aluminum chloride vapors by a lateral introduction of chlorin with a lateral removal of aluminum chloride vapors.

4. The process of claim 3 wherein bauxite and coke are introduced in a raw state and freed of volatiles during the heating.

5. In the manufacture of aluminum chloride by the interaction of carbon, alumina and chlorin at high temperature in a reaction zone, with the formation of the aluminum chloride as vapor together with other gaseous reaction products, the improvement which comprises maintaining the reaction zone under a superatmospheric pressure between approximately 15 and 30 pounds per square inch gage, to obtain a substantially increased density of vapors with a greater proportion of aluminum chloride per cubic unit and passing the dense vapors to condensing means.

6. The process of claim 1 wherein the reaction zone and condensing zone are maintained at superatmospheric pressures between approximately 15 and 30 pounds per square inch.

7. The process of claim 3 wherein a gas pressure is maintained in the moving column of pervious mixture, of the order of 15 to 30 pounds per square inch, to increase the yield of aluminum chloride vapors.

8. The process of claim 3 wherein the aluminum chloride vapors are condensed under a superatmospheric pressure sufficient to permit recovery of the aluminum chloride in liquid form.

9. In the manufacture of aluminum chloride by the interaction of carbon, alumina and chlorin at high temperature in a reaction zone, the improvement which comprises developing heat in a mixture of carbon and alumina by a blast of air, removing products of combustion, passing the heated charge to a reaction zone, introducing chlorin into the charge to cause formation of aluminum chloride, maintaining the reaction zone under a pressure substantially higher than atmospheric to obtain a substantially increased density of vapors with a greater proportion of aluminum chloride per cubic unit, and passing the dense vapors to condensing means.

10. In the manufacture of aluminum chloride by the interaction of carbon, alumina and chlorin at high temperature in a reaction zone, with the formation of the aluminum chloride as vapor together with other gaseous reaction products, the improvement which comprises maintaining the reaction zone under a pressure substantially higher than atmospheric, to obtain a substantially increased density of vapors with a greater proportion of aluminum chloride per cubic unit, passing the dense vapors to condensing means and maintaining the condensing means under sufficient superatmospheric pressure to obtain the aluminum chloride in liquid form.

GORDON M. ATHERHOLT.